United States Patent
Shin et al.

(10) Patent No.: US 6,593,404 B1
(45) Date of Patent: Jul. 15, 2003

(54) THERMOPLASTIC RESIN COMPOSITION

(75) Inventors: Jun Hyuk Shin, Kyoungki-do (KR); Sam Joo Yang, Kyoungki-do (KR); Young Kil Chang, Seoul (KR)

(73) Assignee: Cheil Industries, Inc., Kyongsang-pukdo (KR)

( * ) Notice: Subject to any disclaimer, the term of this patent is extended or adjusted under 35 U.S.C. 154(b) by 0 days.

(21) Appl. No.: 09/675,426

(22) Filed: Sep. 29, 2000

Related U.S. Application Data

(63) Continuation-in-part of application No. 09/135,968, filed on Aug. 18, 1998, now abandoned.

(30) Foreign Application Priority Data

Oct. 23, 1997 (KR) .............................. 97-54418
Oct. 23, 1997 (KR) .............................. 97-54419

(51) Int. Cl.[7] .............................. C08J 3/00; C08K 5/52; C08K 5/53; C08K 5/51; C08L 51/00
(52) U.S. Cl. .................. 524/140; 524/125; 524/127; 524/141; 524/143; 524/147; 524/148; 524/149; 525/67; 525/71; 525/80; 525/85
(58) Field of Search .................. 524/125, 127, 524/140, 141, 143, 147, 148, 149; 525/67, 71, 80, 85

(56) References Cited

U.S. PATENT DOCUMENTS

| | | | |
|---|---|---|---|
| 3,576,923 A | 4/1971 | Randell et al. | |
| 4,433,088 A | 2/1984 | Haaf et al. | |
| 4,883,835 A | 11/1989 | Buysch et al. | |
| 4,983,658 A | 1/1991 | Kress et al. | |
| 5,030,675 A | 7/1991 | Wittman et al. | |
| 5,061,745 A | 10/1991 | Wittmann et al. | |
| 5,204,394 A | 4/1993 | Gosens et al. | |
| 5,206,404 A | 4/1993 | Gunkel et al. | |
| 5,455,292 A | 10/1995 | Kakegawa et al. | |
| 5,605,962 A | 2/1997 | Suzuki et al. | 525/70 |
| 5,643,981 A | 7/1997 | Yang et al. | |
| 5,672,645 A | 9/1997 | Eckel et al. | |
| 5,674,924 A | 10/1997 | Lee et al. | 523/201 |
| 6,140,399 A | 10/2000 | Munro | 524/127 |

FOREIGN PATENT DOCUMENTS

| | | |
|---|---|---|
| DE | 196 32 675 A1 | 2/1998 |
| EP | 0 700 968 A1 | 3/1996 |
| EP | 0 700 969 A1 | 3/1996 |
| EP | 0 767 204 A2 | 4/1997 |
| JP | 62-25706 | 2/1987 |

*Primary Examiner*—Patrick D. Niland
(74) *Attorney, Agent, or Firm*—Maria Parrish Tungol

(57) ABSTRACT

The present invention relates to flame-retardant thermoplastic resin compositions. More particularly, the present invention relates to the thermoplastic resin compositions which comprise a polycarbonate, a styrene containing graft copolymer, a styrene containing copolymer, a mixture of alkyl substituted, preferably t-butyl substituted, monophosphate esters, a phosphate ester compound, and a fluorinated polyolefin, whose stress cracking resistance and flame retardancy are improved.

16 Claims, No Drawings

THERMOPLASTIC RESIN COMPOSITION

This is a continuation-in-part of Ser. No. 09/135,968, filed Aug. 18, 1998, abandoned.

BACKGROUND OF THE INVENTION

1. Field of the Invention

The present invention relates to flame-retardant thermoplastic resin compositions. More particularly, the present invention relates to the thermoplastic resin compositions which comprise a polycarbonate, a styrene containing graft copolymer, a styrene containing copolymer, a mixture of alkyl substituted, preferably t-butyl substituted, monophosphate esters, a phosphate ester compound, and a fluorinated polyolefin, whose stress cracking resistance and flame retardancy are improved.

2. Discussion of Related Art

Polycarbonate resin compositions are widely used for parts of electrical products and automotive-components because they have a good combination of transparency, high impact strength, and heat resistance. But, polycarbonate resin compositions have poor ocessability during molding process, so polycarbonate resin compositions are usually blended with other resins for improving these properties. For example, a molding composition comprising a polycarbonate resin and a styrenic resin has good processability as well as high notched impact strength.

Furthermore, the polycarbonate molding composition used for parts of home and office appliances should be flame resistant to prevent fires.

To confer flame retardancy to thermoplastic molding compositions, halogen and/or antimony containing-compounds have been incorporated. In U.S. Pat. Nos. 4,983,658 and 4,883,835, a halogen-containing compound is used as a flame retardant. The halogen-containing compound, however, results in corrosion of the mold itself by the hydrogen halide gases released during a molding process and is fatally harmful due to the toxic gases liberated in the case of fire.

As a method for conferring flame-retardancy without using a halogen-based flame retardant, a method using a phosphate ester-based flame retardant is commonly used. The use of halogen-free phosphate ester compound as flame retardants avoids the problems caused by the corrosive and harmful by-products of halogen-based flame retardants. However, the phosphate ester-based flame retardants have tendency to cause deterioration of heat resistance, occurring of stress crack by volatilization of a flame retardant, and juicing during a molding process.

As a method for overcoming these problems, Japanese Patent Publication No. (Sho)62-25706 describes the use of a mixture of an arylphosphate ester prepared by reacting a phosphorus oxychloride with a divalent phenol and a monovalent phenol, and an oligomeric phosphate ester as a flame retardant. However, in this method, the flame retardant prepared by such method results in the corrosion of the mold itself by a phosphorus oxychloride and a residual metal ion derived from a metal salt used as a catalyst such as aluminum chlorides, magnesium chlorides, and so on.

U.S. Pat. Nos. 5,061,745 and 5,030,675 describe polymer blends prepared from an aromatic polycarbonate, an ABS graft copolymer, a styrene containing copolymer, a monophosphate ester such as triphenylphosphate(TPP) as flame retardants, and a fluorinated polyolefin. However, the low stress cracking resistance of these molding compositions often restricts the application of non-halogen-PC/ABS in the field of making parts of electronic and electric products, especially thin-walled parts. And heat resistance of these blends also deteriorates substantially.

In order to reduce the occurrence of stress cracking and deterioration of heat resistance by the use of a monophosphate ester, U.S. Pat. No. 5,204,394 describes a polymer mixture comprising an aromatic polycarbonate, a styrene containing copolymer and/or a styrene containing graft copolymer and an oligomeric phosphate as a flame retardant. In this polymer mixture, it is possible to obtain a V-O rating according to UL-94 using by the oligomeric phosphate whose condensation degree is about 1.4. However, if the condensation degree of the oligomeric phosphates exceed 2.8, the flame retardancy of this polymer mixture decreases rapidly to HE rating and stress cracking resistance of the mixture also decreases.

U.S. Pat. No. 5,672,645 describes flame retardant polycarbonate/ABS molding compounds whose stress cracking resistance is improved by a combination of additives comprising a monomeric phosphorus compound and an oligomeric phosphorus compound as compared with the molding compounds comprising only a monophosphorus compound or an oligomeric phosphorus compound, respectively. However, the heat resistance and stress cracking resistance of these compounds are not sufficient, so an improvement is required.

U.S. Pat. No. 5,206,404 describes compositions of alkylated triphenyl phosphate esters comprising 1 to 20% by weight trialkylphenyl phosphate, 10 to 50% by, weight dialkylphenyl monophenyl phosphate, 15 to 60% by weight monoalkylphenyl diphenyl phosphate and less than 2% by weight triphenyl phosphate. However, this publication contains no indication of any improvement in stress cracking resistance and flame retardancy of thermoplastic resin compositions by adding these mixtures of triaryl phosphate esters.

The present invention is based on the discovery that flame retardant thermoplastic resin compositions with excellent stress cracking resistance and heat-resistance may be produced by adding flame retardants comprising a phosphate ester and a mixture of alkyl substituted, preferably t-butyl substituted, monophosphate esters of U.S. Pat. No. 5,206,404. The flame retardant thermoplastic resin compositions of this invention have good stress cracking resistance and elevated heat resistancy as compared with the molding compound of U.S. Pat. No. 5,672,645 comprising a monophosphorus compound and an oligomeric phosphorus compound as a flame retardant.

OBJECTS OF THE INVENTION

An object of the present invention is to provide a flame-retardant thermoplastic resin composition with excellent stress cracking resistance and improved heat resistance which comprises a polycarbonate, a styrene containing graft copolymer, a styrene containing copolymer, a mixture of alkyl substituted, preferably t-butyl substituted, monophosphate esters, a phosphate ester, and a fluorinated polyolefin.

SUMMARY OF THE INVENTION

The present invention relates to thermoplastic resin compositions comprising:
   (A) 40 to 95 parts by weight of a halogen-free, thermoplastic polycarbonate;
   (B) 5 to 50 parts by weight of a styrene containing graft copolymer prepared by grafting (B-1) onto (B-2)

(B-1) 5 to 95% by weight, based on (B), of a mixture of
  (B-1.1) 50 to 100% by weight of styrene, α-methyl styrene, nucleus-substituted styrene, methyl methacrylate or a mixture thereof, and
  (B-1.2) 50 to 0% by weight of acrylonitrile, methacrylonitrile, $C_1$–$C_8$ alkyl methacrylate, $C_1$–$C_8$ alkyl acrylate, maleic anhydride, N-substituted maleimide, or a mixture thereof
(B.2) 95 to 5% by weight, based on (B), of a rubber with a glass transition temperature(Tg) of below −10° C. and selected from the group consisting of butadiene rubbers, acryl rubbers, ethylene/propylene rubbers, styrene/butadiene rubbers, acrylonitrile/butadiene rubbers, butadiene/styrene rubbers, polyisoprene, EPDM (ethylene-propylene-diene terpolyrner) rubbers, polyorganosyloxane, and mixtures thereof;
(C) 0 to 30 parts by weight of a styrene containing copolymer prepared from
  (C-1) 50 to 95% by weight of styrene, α-methyl styrene, nucleus-substituted styrene, methyl methacrylate or a mixture thereof, and
  (C-2) 50 to 5% by weight of acrylonitrile, $C_1$–$C_8$ alkyl methacrylate, $C_1$–$C_8$ alkyl acrylate, or a mixture thereof,
(D) 5 to 20 parts by weight, based on 100 parts by weight of (A)+(B)+(C), of a mixture comprising
  (D-1) 100 to 5% by weight of admixture of alkyl substituted, monophosphate esters of the formula(I)

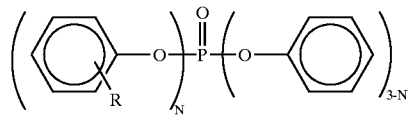

(I)

in which,
R is an alkyl group selected from t-butyl, isopropyl, isobutyl, isoamyl, t-amyl and N is 0 or an integer from 1 to 3, and
  (D-2) 0 to 95% by weight of phosphate esters of the formula (II)

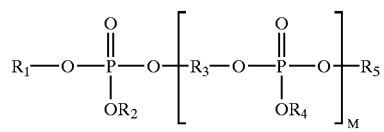

(II)

in which,
$R_1$, $R_2$, $R_4$, and $R_5$ are independently cresyl, phenyl, xylenyl, propylphenyl, butylphenyl, or brominated or chlorinated derivatives thereof,
$R_3$ is an arylene group, and
M is 0 to 5; and
(E) 0 to 2 parts by weight, based on 100 parts by weight of (A)+(B)+(C), of a fluorinated polyolefin polymer.

In addition to the components mentioned hereinbefore, the thermoplastic resin compositions according to the present invention may further contain one or more conventional additives. For example, inorganic fillers such as mica, talc, zeolite, and montmorillonite, pigments, dyes, glass fibers, carbon fibers, thermal stabilizers, light stabilizers, antioxidants, plasticizers, and mold release agents may be added in fabrications as needed.

DETAILED DESCRIPTION OF PREFERRED EMBODIMENTS

The thermoplastic resin compositions according to the invention comprise a polycarbonate, a styrene containing graft copolymer, a styrene containing copolymer, a mixture, of alkyl substituted monophosphate esters, a phosphate ester compound and a fluorinated polyolefin polymer.

Hereinafter the detailed description regarding the respective components is provided.

(A) Thermoplastic, Halogen-free Polycarbonates

Suitable component (A) thermoplastic halogen-free polycarbonates according to the invention are those generally prepared by reacting diphenols of the following formula ( ) with a phosgene or a carbonic diester.

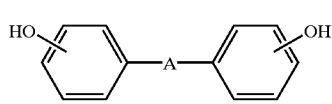

(III)

in which,
A is a single bond, $C_1$–$C_5$ alkylene, $C_2$–$C_5$ alkylidene, $C_5$–$C_6$ cycloalkylidene, —S— or —$SO_2$—.

Suitable diphenols of the formula (III) are, for example, 4,4'dihydroxydiphebnyl, 2,2-bis-(4-hydroxyphenyl)propane, 1,1-bis-(4-hydroxyphenyl) cyclohexane, and the like. The most preferred and widely used thermoplastic, halogen-free polycarbonates are aromatic polycarbonates synthesized from 2,2-bis(4-hydroxy-phenyl)propane, called "Bisphenol A".

The production of the polycarbonates of component (A) suitable for use in accordance with the invention is known from literature, for example U.S. Pat. No. 3,169,121, and may be carried out in a known manner from diphenols with phosgene using the phase interface process or with phosgene using the homogeneous phase process.

Preferred polycarbonates according to the present invention have an weight average molecular weights ($M_w$ as measured for example by ultracentrifugation or by scattered light measurement) of from 10,000 to 500,000 and preferably from 18,000 to 300,000. Polycarbonates with a certain molecular weight may be obtained by using a monophenol such as phenol, paracresol, or paraisooctylphenol as chain terminator. The polycarbonates suitable for use in accordance with the invention include both homopolycarbonates and copolycarbonates.

In the present invention, the polycarbonate resins(A) comprise a base resin along with styrene containing graft copolymers and styrene containing copolymers.

(B) Styrene Containing Graft Copolymer

Styrene containing graft copolymer which may be used according to the invention are those prepared by grafting constituent (B-1) onto (B-2):
(B-1) 5 to 95% by weight, based on (B), of a mixture of
  (B-1.1) 50 to 100% by weight of styrene, α-methyl styrene, nucleus-substituted styrene, methyl methacrylate or a mixture thereof and
  (B-1.2) 50 to 0% by weight of acrylonitrile, methacrylonitrile, $C_1$–$C_8$ alkyl methacrylate, $C_1$–$C_8$ alkyl acrylate, maleic anhydride, N-substituted maleimide or a mixture thereof
(B.2) 95 to 5% by weight, based on (B), of a rubber having a glass transition temperature(Tg) of below −10 and selected from the group consisting of butadiene rubbers, acryl rubbers, ethylene/propylene rubbers, styrene/butadiene rubbers, acrylonitrile/butadiene rubbers, butadiene/styrene rubbers, polyisoprene, EPDM rubbers, polyorganosyloxane, and mixtures thereof Nucleus-substituted styrenes (B-1.1) are nucleus-alkylated styrenes such as, for example, p-methyl styrene.

Particularly preferred styrene containing graft copolymer(B) is the so-called ABS resin.

The preferred average particle size of the rubber is from 0.05 to 4 in order to improve the impact strength and the appearance of the moldings.

The styrene containing graft copolymers of component (B) may be prepared according to conventional methods of preparing copolymer, in particular, emulsion, suspension, solution or bulk polymerization. Preferred method for preparing the graft copolymer (B) is emulsion or bulk process.

(C) Styrene Containing Copolymers

The styrene containing copolymers of component (C) to be used in accordance with the invention are those prepared from: (1) 50 to 95% by weight of styrene, -methyl styrene, nucleus-substituted styrene, methyl methacrylate or a mixture thereof(C-1), and (2) 50 to 5% by weight of acrylonitrile, $C_1$–$C_8$ alkyl methacrylate, $C_1$–$C_8$ alkyl acrylate, or a mixture thereof(C-2). A specific example of the styrene containing copolymer is SAN(styrene/acrylonitrile) resin, which is prepared by copolymerizing styrene and acrylonitrile. In the copolymerization, 60 to 90% by weight of styrene and 40 to 10% by weight of acrylonitrile are used.

The styrene containing copolymer of component (C) may be prepared by conventional copolymerization processes, in particular, by suspension or bulk polymerization.

(D-1) A Mixture of Alkyl Substituted Monophosphate Esters

The thermoplastic resin compositions according to the present invention contain as a flame retardant a mixture of alkyl substituted monophosphate esters(D-1), and a phosphate ester compound(D-2). Component (D-1) is a mixture of alkyl substituted monophosphate esters of the following formula (I)

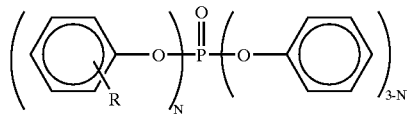

in which,
R is an alkyl group selected from t-butyl, isopropyl, isobutyl, isoamyl, t-amyl, and N is 0 or an integer from 1 to 3, Preferably, the component (D-1) is a mixture of alkyl substituted monophosphate esters comprising by weight 1 to 20% trialkylphenyl phosphate(N=3), 10 to 50% dialkylphenyl monophenyl phosphate(N=2), 15 to 60% monoalkylphenyl diphenyl phosphate(N=1) and less than 2% triphenyl phosphate(N=0). The preferred substituent R is t-butyl and isopropyl. The most preferred substituent R is t-butyl. A mixture of the mixed t-butylphenyl phosphate esters and the mixed isopropylphenyl phosphate esters are also preferrable.

(D-2) Phosphate Esters

The phosphate esters according to the invention have the following formula(II).

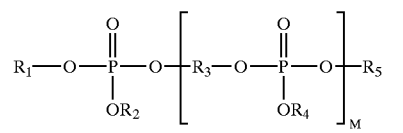

in which,
$R_1$, $R_2$, $R_4$, and $R_5$ are independently halogen-free phenyl group or $C_1$–$C_4$ alkylated aryl group,
$R_3$ is an arylene group, and
M is 0 to 5.

In the formula, the compound of which M is 0, is a usual monomeric phosphate ester and the compound of which M exceeds 0, is an oligomeric phosphate compound. That is, the phosphate-based flame retardant useful in the thermoplastic resin compositions according to the present invention comprises compounds of the formula (II) having M values from 0 to 5.

Preferred substituents $R_1$, $R_2$, $R_4$, and $R_5$ are independently one of cresyl, phenyl, xylenyl, propylphenyl, butylphenyl, and brominated or chlorinated derivatives thereof $R_3$ is derived from diphenols such as, for example, bisphenol A, resorcinol or hydroquinone. Examples of preferred phosphate esters are a phosphate ester such as triphenyl phosphate, tri(2,6-dimethylphenyl) phosphate, tri(4-methylphenyl) phosphate, tricresyl phosphate, diphenylcresyl phosphate, tri(isopropylphenyl) phosphate, trixylenyl phosphate, xylenyldiphenylphosphate, an oligomeric phosphorus compound thereof, or mixtures of these compounds.

The thermoplastic resin compositions according to the invention contain a mixture of (D-1) and (D-2) as a flame retardant. The weight ratios of (D-1) and (D-2) may be varied within a wide range. The weight ratio of (D-1) to (D-2) is preferably between 100:0 and 5:95, more preferably between 80:20 and 5:95 and the most preferably between 55:45 and 15:85.

(E) Fluorinated Polyolefin

Preferred fluorinated polyolefins (E) are polytetrafluoroethylene, polyvinylidene fluoride, tetrafluoroethylene/vinylidene fluoride copolymer, and tetrafluoroethylene/hexafluoropropylene copolyemer. These fluorinated polyolefins may be used alone or in admixture with other two or more fluorinated polyolefins. These polymers may be produced by known processes, such as for example, by polymerization of tetrafluoroethylene in an aqueous medium with a free radical forming catalyst.

The use of fluorinated polyolefins decreases flow viscosity of the thermoplastic resin composition and increases coefficient of shrinkage of the composition by forming a fibrillar network during extruding, thereby reducing or preventing the dripping of the melting resin.

The fluorinated polyolefins may be used in powder form or in emulsion form. Fluorinated polyolefins of emulsion form have good dispersibility, but make the preparation process complicated. Therefore, it is desired to use powder form fluorinated polyolefins capable of being dispersed evenly in the total resins and forming fibrillar network.

The fluorinated polyolefin suitable for use in accordance with the invention is polytetrafluoroethylene. Polytetrafluoroethylene with an average particle size of 0.05 to 1,000 $\mu$m is suitable for blending.

0 to 2.0 parts by weight of a fluorinated polyolefin polymer, based on 100 parts by weight of the base resin (A)+(B)+(C) is blended.

Conventional Additives

In addition to the above-mentioned constituents, the thermoplastic resin compositions according to the invention may further contain one or more other conventional additives. For example, inorganic fillers, thermal stabilizers, antioxidants, light stabilizers, plasticizers, pigments, dyes, and mold releasing agents may be added. The content of these conventional additives may be 0 to 50 parts by weight based on 100 parts by weight of the base resin (A)+(B)+(C).

The thermoplastic resin compositions are prepared according to the conventional techniques of preparing resin compositions, for example, by mixing together the constituents including the various additives and melt-extruding with extruders in pellet form.

DESCRIPTIONS OF THE PREFERRRED EMBODIMENTS

Following are examples which illustrate procedures including the best mode, for practicing the invention. They are not to be construed to limit the scope of the invention defined by the appended claims in any manner whatsoever. All percentages are by weight unless otherwise noted.

The following constituents were used in the examples hereinafter:

(A) Polycarbonate

Polycarbonate of Bisphenol A having a weight average molecular Weight of 20,000 was used.

(B) Styrene-containing Graft Copolymer (ABS)

45 parts by weight of butadiene latex in powder, 36 parts by weight of styrene, 14 parts by weight of acrylonitrile, and 150 parts by weight of deionized water were mixed, and 1.0 parts by weight of potassium oleate, 0.4 parts by weight of cumene hydroperoxide, and 0.3 parts by weight of mercaptan-based chain transfer agent were added to the mixed solution. The resulting solution was kept at 75° C. for 5 hours to prepare a graft ABS(g-ABS) latex. To the resulting graft copolymer, 1% sulfuric acid solution was added to prepare ABS resin in powder.

(C) Styrene-containing Copolymer(SAN)

To a mixed solution of 70 parts by weight of styrene, 30 parts by weight of acrylonitrile and 120 parts by weight of deionized water, 0.2 parts by weight of azobisisobutylonitrile and 0.5 parts by weight of tricalcium phosphate were added. SAN copolymer was prepared by suspension polymerization by washing, dehydrating and drying the resultant product. SAN copolymer in powder form was obtained.

(D-1) A mixture of t-butyl substituted monophpsphate esters

A mixture of t-butyl substituted monophosphate esters containing 0.5% by weight of triphenyl phosphate, 33.2% by weight of diphenyl (t-butylphenyl) phosphate, 49.5% by weight of phenyl di(t-butylphenyl) phosphate and 12.5% by weight of tri(t-butylphenyl) phosphate was used.

(D-2 1) Monomeric phosphate ester

Triphenyl phosphate (TPP) of Daihachi Co. of Japan was used.

(D-22) Oligomeric phosphate ester

Resorcinoldiphosphate(RDP) with and average M value of 1.3 in Formula (II) was used.

(E) Fluorinated polyolefin

Polytertrafluoroethylene with an average particle size of 10–50 μm was used.

EXAMPLES 1–4 AND COMPARATIVE EXAMPLES 1–4

Eight different thermoplastic resin compositions were prepared from the above-mentioned constituents in the amount as indicated in the following Table 1 and the properties of the compositions were also shown in Table 1. The indicated constituents were mixed with an antioxidant and a thermal stabilizer, and compounded then in a twin-screw extruder(L/D 29, φ=45). The resulting extrudates were pelletized and the test pieces were injection-molded from the pellets at the temperature of 220–280° C. and maintained at 23° C., 50% RH before measuring the properties.

The thermoplastic resin compositions of Examples 1 to 4 were those comprising a mixture of t-butyl substituted monophosphate esters(D-1), and a monomeric phosphate ester(D-21) or an oligomeric phosphate ester(D-22). The thermoplastic resin compositions of Comparative Examples 1 to 4 are those having the same compositions with the composition of example 1 but as a flame retardant containing only a monophosphate ester compound, an oligomeric phosphate ester compound or both, respectively.

TABLE 1

| | EXAMPLE NO. | | | | | | | |
|---|---|---|---|---|---|---|---|---|
| | EXAMPLES | | | | COMPARATIVE EXAMPLES | | | |
| | 1 | 2 | 3 | 4 | 1 | 2 | 3 | 4 |
| COMPOSITIONS (parts by eight) | | | | | | | | |
| (A) Polycarbonate | 80 | 80 | 80 | 80 | 80 | 80 | 80 | 80 |
| (B) Graft copolymer (g-ABS) | 10 | 10 | 10 | 10 | 10 | 10 | 10 | 10 |
| (C) SAN | 10 | 10 | 10 | 10 | 10 | 10 | 10 | 10 |
| (D-1) A mixture of t-buyl substituted monophostphates | 7 | 3 | 7 | 3 | — | — | — | — |
| (D-21) TPP | 3 | 7 | — | — | 10 | — | 7 | 3 |
| (D-22) RDP | — | — | 3 | 7 | — | 10 | 3 | 7 |
| (E) Fluorinated polyolefin (7AJ) | 0.4 | 0.4 | 0.4 | 0.4 | 0.4 | 0.4 | 0.4 | 0.4 |
| PROPERTIES | | | | | | | | |
| Heat Resistance (VST, )[1] | 100 | 97 | 103 | 102 | 93 | 99 | 96 | 97 |
| Number of cracks[2] | 3 | 7 | 2 | 6 | 31 | 24 | 19 | 13 |
| Total length of the cracks (mm)[3] | 13.5 | 35.4 | 11.3 | 33.7 | 235.5 | 194.7 | 150.5 | 89.3 |

TEST METHOD

[1]Heat resistance was determined according to ASTM D306.

[2]Determined by measuring the number of the cracks generated following the storage for 24 hours in the oven at the temperature of 80 after injection molding the test pieces by a box-shaped mold.

[3]Determined by measuring the total length of the cracks generated following the storage for 24 hours in the oven at the temperature of 80 after injection molding the 20 test pieces by a box-shaped mold.

EXAMPLES 5–11 AND COMPARATIVE EXAMPLES 5–8

Thermoplastic resin compositions having a composition as shown in Table 2 and Table 3 were prepared by the same method with Example 1–4 and the measured properties were also shown in Table 2 and Table 3.

TABLE 2

| | EXAMPLE NO. EXAMPLES. | | | | | | |
|---|---|---|---|---|---|---|---|
| | 5 | 6 | 7 | 8 | 9 | 10 | 11 |
| COMPOSITIONS (parts by eight) | | | | | | | |
| (A) Polycarbonates | 80 | 80 | 80 | 80 | 80 | 80 | 80 |
| (B) Graft polymer (g-ABS) | 10 | 10 | 10 | 10 | 10 | 10 | 10 |
| (C) SAN | 10 | 10 | 10 | 10 | 10 | 10 | 10 |
| (D-1) A mixture of t-buyl substituted monophostphates | 10 | 8 | 8 | 6 | 6 | 4 | 4 |
| (D-21) TPP | — | 2 | — | 4 | — | 6 | — |
| (D-22) RDP | — | — | 2 | — | 4 | — | 6 |
| (E) Fluorinated polyolefin (7AJ) | 0.4 | 0.4 | 0.4 | 0.4 | 0.4 | 0.4 | 0.4 |
| 16/23 PROPERTIES | | | | | | | |
| Heat Resistance (VST, ° C.) | 105 | 103 | 104 | 101 | 103 | 98 | 102 |
| Number of cracks | 1 | 3 | 2 | 6 | 5 | 11 | 7 |
| Total length of the cracks | 5.3 | 13.5 | 11.3 | 33.7 | 29.6 | 53.1 | 36.7 |

TEST METHOD
[1]Heat resistance was determined according to ASTM D306.
[2]Determined by measuring the number of the cracks generated following the storage for 24 hours in the oven at the temperature of 80 after injection molding the test pieces by a box-shaped mold.
[3]Determined by measuring the total length of the cracks generated following the storage for 24 hours in the oven at the temperature of 80 after injection molding the test pieces by a box-shaped mold.

TABLE 3

| | EXAMPLE NO. COMPARATIVE EXAMPLES | | | |
|---|---|---|---|---|
| | 5 | 6 | 7 | 8 |
| COMPOSITIONS: (parts by eight) | | | | |
| (A) Polycarbonates | 80 | 80 | 80 | 80 |
| (B) Graft copolymer (g-ABS) | 10 | 10 | 10 | 10 |
| (C) SAN | 10 | 10 | 10 | 10 |
| (D-1) A mixture of t-buyl substituted monophostphates | — | — | — | — |
| (D-21) TPP | 8 | 2 | 6 | 4 |
| (D-22) RDP | 2 | 8 | 4 | 6 |
| (E) Fluorinated polyolefin (7AJ) | 0.4 | 0.4 | 0.4 | 0.4 |
| PROPERTIES | | | | |
| Heat Resistance (VST, ° C.) | 95 | 99 | 97 | 96 |
| Number of cracks | 28 | 18 | 25 | 23 |
| Total length of the cracks | 124.3 | 103.2 | 117.6 | 110.8 |

TEST METHOD
[1]Heat resistance was determined according to ASTM D306.
[2]Determined by measuring the number of the cracks generated following the storage for 24 hours in the oven at the temperature of 80 after injection molding the test pieces by a box-shaped mold.
[3]Determined by measuring the total length of the cracks generated following the storage for 24 hours in the oven at the temperature of 80 after injection molding the test pieces by a box-shaped mold.

TABLE 4

| | EXAMPLE NO. | | | |
|---|---|---|---|---|
| | EXAMPLES | | COMPARATIVE EXAMPLES | |
| | 12 | 13 | 9 | 10 |
| COMPOSITIONS (parts by weight) | | | | |
| (A) Polycarbonate | 80 | 80 | 80 | 80 |
| (B) Graft copolymers (g-ABS) | 10 | 10 | 10 | 10 |
| (C) SAN | 10 | 10 | 10 | 10 |
| (D-11) A mixture of isopropyl substituted monophosphate | 7 | 7 | — | — |
| (D-21) TPP | 3 | — | 10 | 7 |
| (D-22) RDP | — | 3 | — | 3 |
| (E) Fluorinated polyolefin (7AJ) | 0.4 | 0.4 | 0.4 | 0.4 |
| Properties | | | | |
| Heat Resistance (VST) | 99 | 102 | 93 | 96 |
| Number of Cracks | 5 | 3 | 31 | 19 |
| Total Length of Cracks (mm) | 21.3 | 15.7 | 235.5 | 150.5 |

Component (D-11) was as mixture of isopropyl substituted monophosphate esters containing 0.8% by weight of triphenyl phosphate, 32.5% by weight of diphenyl (isopropylphenyl)-phosphate, 53.2% by weight of phenyl di(isopropylphenyl) phosphate, and 13.5% by weight of tri(isopropylphenyl) phosphate. Other components such as (A), (B), (C), (D-21), (D-22), and (E) were the same as the previous Examples. The methods for preparing the resin compositions and measuring their properties were also the same.

As shown in Tables 1 and 2, examples 1–4 and 5–11 showed improved heat resistance and drastic reduction in number and length of the cracks. By contrast, comparative examples 1–4 and 5–8 showed poor heat resistance and increased number and length of the cracks. As can be seen from the results of Tables 1, 2, 3, and 4, the thermoplastic resin compositions according to the invention, which contain as a flame retardant, a mixture of alkyl substituted monophosphate esters, and a monomeric phosphate ester or an oligomeric phosphate ester showed distinctly higher stress cracking resistance and improved heat resistance than those of the comparative examples with only monomeric phosphate ester(Comparative Examples 1 and 9), only oligomeric phosphate ester(Comparative Example 2) or a mixture of monomeric phosphate ester and oligomeric phosphate ester(Comparative Examples 3–8 and 10).

Consequently, these results show that stress cracking resistance and heat resistance of the thermoplastic resin compositions according to the present invention are substantially improved by a combination of flame retardants comprising a mixture of alkyl substituted monophosphate esters and a phosphate ester compound.

We claim:

1. A thermoplastic resin composition containing (A) 40 to 95 parts by weight of a halogen-free, thermoplastic polycarbonate;

(B) 5 to 50 parts by weight of a styrene-containing graft copolymer prepared by grafting (B-1) onto (B-2)

(B-1) 5 to 95% by weight, based on (B), of a mixture of (B-1.1) 50 to 100% by weight of styrene, α-methyl styrene, nucleus-substituted styrene, methyl methacrylate or a mixture thereof, and (B-1.2) 50 to 0% by weight of acrylonitrile, methacrylonitrile, $C_1$–$C_8$ alkyl methacrylate, $C_1$–$C_8$ alkyl acrylate, alkyl acrylate, maleic anhydride, N-substituted maleimide or a mixture thereof (B.2) 95 to 5% by weight, based on (B), of a rubber with a glass transition temperature (Tg) of below −10° C. and selected from the group consisting of butadiene rubbers, acryl rubbers, ethylene/propylene rubbers, styrene/butadiene rubbers, acrylonitrile/butadiene rubbers, butadiene/styrene rubbers, polyisoprene, EPDM rubbers, polyorganosiloxane, and mixtures thereof;

(C) 0 to 30 parts by weight of a styrene containing copolymer prepared from (C-1) 50 to 95% by weight of styrene, α-methyl styrene, nucleus-substituted styrene, methyl methacrylate or a mixture thereof, and (C-2) 50 to 5% by weight of acrylonitrile, $C_1$–$C_8$ alkyl methacrylate, $C_1$–$C_8$ alkyl acrylate, or a mixture thereof;

(D) 5 to 20 parts by weight, based on 100 parts by weight of (A)+(B)+(C), of a mixture comprising (D-1) 100 to 5 % by weight of a mixture of alkyl substituted monophosphate esters of the formula(I)

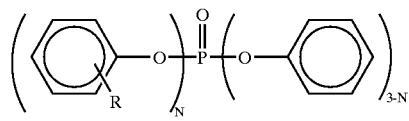

in which,

R is an alkyl group selected from the group consisting of t-butyl, isopropyl, isobutyl, isoamyl, and t-amyl, and N is an integer from 1 to 3; and (D-2) 0 to 95 % by weight, of phosphate esters of the formula (II)

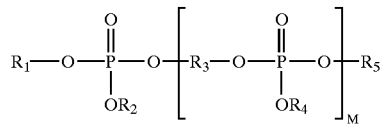

in which, $R_1$, $R_2$, $R_4$, and $R_5$ are independently cresyl, phenyl, xylenyl, propylphenyl, butylphenyl, or brominated or chlorinated derivatives thereof, $R_3$ is an arylene group, and M is 0 to 5; and E) 0 to 2 parts by weight, based on 100 parts by weight of(A)+(B)+(C), of a fluorinated polyolefin polymer.

2. A thermoplastic resin composition according to claim 1, wherein said component (D-1) is a mixture comprising by weight 1 to 20% of the alkyl substituted monophosphate ester having N value of 3, 10 to 50% of the alkyl substituted monophosphate ester having N value of 2, 15 to 60% of the alkyl substituted monophosphate ester having N value of 1, and further contains less than 2% triphenyl phosphate.

3. A thermoplastic resin composition according to claim 1, wherein weight ratio of (D-1) to (D-2) is between 80:20 and 5:95.

4. A thermoplastic resin composition according to claim 1, wherein weight ratio of (D-1) to (D-2) is between 55:45 and 15:85.

5. A thermoplastic resin composition according to claim 1, wherein said alkyl group (R) is t-butyl.

6. A thermoplastic resin composition according to claim 1, wherein said alkyl group (R) is isopropyl.

7. A thermoplastic resin composition according to claim 1, wherein said alkyl group (R) is isoamyl.

8. A thermoplastic resin composition according to claim 1, wherein said alkyl group (R) is t-amyl.

9. A thermoplastic resin composition according to claim 1, wherein said component (D-1) is a mixture of the mixed t-butyl substituted monophosphate esters and the mixed isopropyl substituted monophosphate esters.

10. A thermoplastic resin composition according to claim 1, wherein said resin composition further includes at least one additives selected from the group consisting of inorganic fillers, glass fibers, carbon fibers, thermal stabilizers, antioxidants, light stabilizers, plasticizers, mold release agents, pigments, and dyes.

11. A thermoplastic resin composition according to claim 2, wherein said component (D-1) is a mixed t-butyl substituted monophosphate ester composition comprising by weight 1 to 20% tri(t-butylphenyl) phosphate, 10 to 50% di(t-butylphenyl) phenyl phosphate, 15 to 60% diphenyl (t-butylphenyl) phosphate and further contains less than 2% triphenyl phosphate.

12. A thermoplastic resin composition according to claim 2, wherein said alkyl is isopropyl.

13. A thermoplastic resin composition according to claim 2, wherein said alkyl is isoamyl or t-amyl.

14. A thermoplastic composition according to claim 1 wherein the amount of (D-2) is 0%.

15. A thermoplastic composition according to claim 2, wherein the amount of (D-2) is 0%.

16. A thermoplastic composition according to claim 1, wherein the amount of (D-2) is 0%.

* * * * *